US012606774B2

(12) United States Patent
Diederichs et al.

(10) Patent No.: US 12,606,774 B2
(45) Date of Patent: Apr. 21, 2026

(54) METHYL ESTER ETHOXYLATES WITH A MIXTURE OF C18 MONOUNSATURATED AND C18 UNSATURATED/POLYUNSATURATED ALKYL GROUPS

(71) Applicant: Clariant International Ltd, Muttenz (CH)

(72) Inventors: Jan Diederichs, Gendorf (DE); Xiaoqiang Guo, Frankfurt am Main (DE); Peter Josef Hallier, Frankfurt am Main (DE); Felix Hövelmann, Burgkirchen (DE); Kevin James Mutch, The Woodlands, TX (US); Carsten Schaefer, Frankfurt (DE); Stephen Norman Batchelor, Merseyside (GB); Julie Bennett, Merseyside (GB)

(73) Assignee: CLARIANT INTERNATIONAL LTD, Muttenz (CH)

( * ) Notice: Subject to any disclaimer, the term of this patent is extended or adjusted under 35 U.S.C. 154(b) by 188 days.

(21) Appl. No.: 18/557,457

(22) PCT Filed: Apr. 19, 2022

(86) PCT No.: PCT/EP2022/060309

§ 371 (c)(1),
(2) Date: Oct. 26, 2023

(87) PCT Pub. No.: WO2022/228945

PCT Pub. Date: Nov. 3, 2022

(65) Prior Publication Data

US 2024/0218287 A1 Jul. 4, 2024

(30) Foreign Application Priority Data

Apr. 30, 2021 (EP) .................................... 21171582

(51) Int. Cl.
*C11D 1/74* (2006.01)
*C11D 3/00* (2006.01)

(52) U.S. Cl.
CPC .............. *C11D 1/74* (2013.01); *C11D 3/0026* (2013.01); *C11D 2111/12* (2024.01)

(58) Field of Classification Search
CPC ...... C11D 1/74; C11D 3/0026; C11D 2111/12
See application file for complete search history.

(56) References Cited

U.S. PATENT DOCUMENTS

| | | | | |
|---|---|---|---|---|
| 2011/0224121 | A1 | 9/2011 | Varineau | |
| 2018/0265807 | A1* | 9/2018 | Morimoto | C11D 1/74 |
| 2020/0247817 | A1* | 8/2020 | Haetzelt | C11D 3/507 |
| 2021/0009500 | A1* | 1/2021 | Joko | B01J 21/04 |
| 2022/0259375 | A1* | 8/2022 | Hövelmann | B01J 37/04 |

FOREIGN PATENT DOCUMENTS

| | | | |
|---|---|---|---|
| CN | 1088251 | | 6/1994 |
| CN | 1604959 | | 4/2005 |
| WO | 2020/239750 | * | 12/2020 |
| WO | 2020239750 | A1 | 12/2020 |

OTHER PUBLICATIONS

C. Kolano, Household and Personal Care Today, (2012), pp. 52-55.
Cox, Michael F., and Upali Weerasooriya. "Methyl ester ethoxylates." Journal of the American Oil Chemists' Society 74.7 (1997): 847-859.
Fattah et. al., June 2020_vol. 8 article 101.
Hama, I., T. Okamoto, and H. Nakamura. "Preparation and properties of ethoxylated fatty methyl ester nonionics." Journal of the American Oil Chemists' Society 72.7 (1995): 781-784.
Hayes, D.G., Biobased Surfactants (Second Edition) Synthesis, Properties, and Applications, AOCS press, (2019), pp. 287-301.
Hreczuch, I. W. "Ethoxylated rapeseed oil acid methyl esters as new ingredients for detergent formulations." Tenside, surfactants, detergents 38.2 (2001): 72-79.
International Search Report issued in App. No. PCT/EP2022/060309, dated Jun. 29, 2022, 3 pages.
Kolano CH et al: "Methylesterethoxylate—Tensideigenschaften im Vergleich zum Herstellverfahren", SOFW Journal, Verlag Fuer Chemische Industrie H. Ziolkowsky GMBH, DE, vol. 138, No. 6, Jun. 1, 2012 (Jun. 1, 2012), p. 25, XP001576057, ISSN: 0942-7694.
Renkin M et al, "Rapeseed Methyl Ester Ethoxylates: a New Class of Surfactants of Environmental and Commercial Interest", Tenside, Surfactants, Detergents, Carl Hanser Verlag GMBH & Co. KG, DE, (Sep. 1, 2005), vol. 42, No. 5, ISSN 0932-3414, pp. 280-287, XP001235608.

* cited by examiner

*Primary Examiner* — Charles I Boyer

(57) ABSTRACT

Specific mixtures of methyl ester ethoxylates are described. The mixtures may be advantageously used as surfactants in laundry detergent compositions and preferably in liquid laundry detergent compositions.

17 Claims, No Drawings

METHYL ESTER ETHOXYLATES WITH A MIXTURE OF C18 MONOUNSATURATED AND C18 UNSATURATED/POLYUNSATURATED ALKYL GROUPS

The present invention relates to specific mixtures of methyl ester ethoxylates, to a method for their preparation and to ethoxylation products obtainable by an inventive method.

The mixtures of methyl ester ethoxylates according to the invention may advantageously be used in laundry detergent compositions, preferably in liquid laundry detergent compositions, and in particular may be employed as surfactants in these laundry detergent compositions.

Despite the prior art there remains a need for improved liquid laundry detergent compositions, e.g. with respect to their foaming characteristics.

It was therefore the object of the present invention to provide new substances that may be used in laundry detergent compositions, preferably in liquid laundry detergent compositions, e.g. as surfactants, and that impart advantageous foaming characteristics to the laundry detergent compositions when used therein.

It has surprisingly been found that this object is solved by a mixture of methyl ester ethoxylates of the formula (I)

$$R_1COO-(CH_2CH_2O)_x-CH_3 \quad (I)$$

wherein $R_1$ is selected from the group consisting of linear or branched, preferably linear, saturated alkyl groups with 7 to 30 carbon atoms, linear or branched, preferably linear, mono- or polyunsaturated alkenyl groups with 7 to 30 carbon atoms, and combinations thereof, and x is selected from integer numbers from 1 to 200, and the average number of $(CH_2CH_2O)$-units of the methyl ester ethoxylates of the formula (I) in the mixture is a number from 5 to 25, preferably from 7 to 13, more preferably from 9 to 11 and even more preferably 10, characterized in that the mixture comprises components (Z1) and (Z2)

(Z1) one or more methyl ester ethoxylates of the formula (I), wherein $R_1$ is selected from the group consisting of linear or branched, preferably linear, monounsaturated alkenyl groups with 17 carbon atoms and combinations thereof and (Z2) one or more methyl ester ethoxylates of the formula (I), wherein $R_1$ is selected from the group consisting of linear or branched, preferably linear, saturated alkyl groups with 17 carbon atoms, linear or branched, preferably linear, polyunsaturated alkenyl groups with 17 carbon atoms, and combinations thereof, and the molar ratio of component (Z1) to component (Z2) is at least 2.2:1.0.

Therefore, a subject matter of the invention is a mixture of methyl ester ethoxylates of the formula (I)

$$R_1COO-(CH_2CH_2O)_x-CH_3 \quad (I)$$

wherein $R_1$ is selected from the group consisting of linear or branched, preferably linear, saturated alkyl groups with 7 to 30 carbon atoms, linear or branched, preferably linear, mono- or polyunsaturated alkenyl groups with 7 to 30 carbon atoms, and combinations thereof, and x is selected from integer numbers from 1 to 200, and the average number of $(CH_2CH_2O)$-units of the methyl ester ethoxylates of the formula (I) in the mixture is a number from 5 to 25, preferably from 7 to 13, more preferably from 9 to 11 and even more preferably 10, characterized in that the mixture comprises components (Z1) and (Z2)

(Z1) one or more methyl ester ethoxylates of the formula (I), wherein $R_1$ is selected from the group consisting of linear or branched, preferably linear, monounsaturated alkenyl groups with 17 carbon atoms and combinations thereof and (Z2) one or more methyl ester ethoxylates of the formula (I), wherein $R_1$ is selected from the group consisting of linear or branched, preferably linear, saturated alkyl groups with 17 carbon atoms, linear or branched, preferably linear, polyunsaturated alkenyl groups with 17 carbon atoms, and combinations thereof, and the molar ratio of component (Z1) to component (Z2) is at least 2.2:1.0.

The average number of $(CH_2CH_2O)$-units of the methyl ester ethoxylates of the formula (I) in the mixture according to the invention hereinafter is designated as variable "n".

Methyl ester ethoxylates (MEE) are already known in the prior art. Methyl ester ethoxylate surfactants as described in the prior art are of the form $$RCOO-(CH_2CH_2O)_m-CH_3$$

where RCOO is a fatty acid moiety, such as oleic, stearic, palmitic. Fatty acid nomenclature is to describe the fatty acid by 2 numbers A:B where A is the number of carbons in the fatty acid and B is the number of double bonds it contains. For example oleic is 18:1, stearic is 18:0 and palmitic 16:0. The position of the double bond on the chain may be given in brackets, e.g. 18:1(9) for oleic and 18:2 (9,12) for linoleic, where 9 and 12 are the numbers of carbon atoms as counted from the COOH end.

In the formula $RCOO—(CH_2CH_2O)_m—CH_3$ the variable m is the average number of $(CH_2CH_2O)$-units.

Methyl ester ethoxylates (MEE) of the prior art are described in chapter 8 of Biobased Surfactants (Second Edition) Synthesis, Properties, and Applications pages 287-301 (AOCS press 2019) by G. A. Smith; J. Am. Oil Chem. Soc. vol. 74 (1997) pages 847-859 by M. F. Cox and U. Weerasooriya; Tenside Surf. Det. vol. 38 (2001) pages 72-80 by W. Hreczuch et al.; Household and Personal Care Today (2012) pages 52-55 by C. Kolano et al.; J. Am. Oil Chem. Soc. vol. 72 (1995) pages 781-784 by I. Hama et al.

Methyl ester ethoxylates may be produced by the reaction of methyl ester with ethylene oxide, using catalysts based on calcium or magnesium. The catalyst may be removed or left in the methyl ester ethoxylate.

An alternative route to prepare methyl ester ethoxylates is a transesterification reaction of a methyl ester or esterification reaction of a carboxylic acid with a polyethylene glycol that is methyl terminated at one end of the chain.

The methyl ester may be produced by a transesterification reaction of methanol with a triglyceride, or an esterification reaction of methanol with a fatty acid. Transesterification reactions of methanol with a triglyceride to fatty acid methyl esters and glycerol are e.g. discussed in Fattah et al (Front. Energy Res., June 2020, volume 8 article 101). Common catalysts for these reactions include sodium hydroxide, potassium hydroxide, and sodium methoxide. Esterase and lipase enzymes may also be used. Triglycerides occur naturally in plant fats or oils, sources are e.g. rapeseed oil, castor oil, maize oil, cottonseed oil, olive oil, sesame oil, non-edible vegetable oils, tall oil and any mixture thereof and any derivative thereof. The oil from trees is called tall oil. Used food cooking oils may be utilised. Triglycerides may also be obtained from algae, fungi, yeast or bacteria.

Distillation and fractionation processes may be used in the production of the methyl ester or carboxylic acid to produce the desired carbon chain distribution.

Fatty acids and methyl esters may be obtained from Oleochemical suppliers such as Wilmar, KLK Oleo, Unilever Oleochemical Indonesia. Biodiesel is methyl ester and these sources may be used.

Preferably, the molar ratio of component (Z1) to component (Z2) in the mixture according to the invention is at least 2.5:1.0.

Preferably, the molar ratio of component (Z1) to component (Z2) in the mixture according to the invention is 10.0:1.0 or less.

More preferably, the molar ratio of component (Z1) to component (Z2) in the mixture according to the invention is from 2.9:1.0 to 7.0:1.0.

Preferably, the mixture according to the invention comprises at least 25 mol-%, more preferably from 30 to 85 mol-%, even more preferably from 30 to 70 mol-% and particularly preferably from 30 to 60 mol-%, of the one or more methyl ester ethoxylates of the formula (I), wherein $R_1$ is selected from the group consisting of linear or branched, preferably linear, monounsaturated alkenyl groups with 17 carbon atoms and combinations thereof, in each case based on the total mixture.

Preferably, 80% or more of the double bonds present in the methyl ester ethoxylates of the formula (I) of the mixture according to the invention are present in the cis configuration.

In the mixture according to the invention, the methyl ester ethoxylates of the formula (I), wherein $R_1$ is selected from the group consisting of linear or branched, preferably linear, monounsaturated alkenyl groups with 17 carbon atoms and combinations thereof, preferably are methyl ester ethoxylates of oleic acid.

Methyl ester ethoxylates of the formula (I), wherein $R_1$ is selected from the group consisting of linear or branched, preferably linear, polyunsaturated alkenyl groups with 17 carbon atoms and comprising two (2) double bonds, and combinations thereof, if present in the mixture according to the invention, preferably are methyl ester ethoxylates of linoleic acid.

Preferably, the mixture according to the invention comprises less than 15 mol-%, more preferably less than 13 mol-% and even more preferably less than 10 mol-% of one or more methyl ester ethoxylates of the formula (I), wherein $R_1$ is selected from the group consisting of linear or branched, preferably linear, polyunsaturated alkenyl groups with 17 carbon atoms, and particularly preferably of one or more methyl ester ethoxylates of the formula (I), wherein $R_1$ is selected from the group consisting of linear or branched, preferably linear, polyunsaturated alkenyl groups with 17 carbon atoms and comprising two (2) or three (3) double bonds, in each case based on the total mixture.

Preferably, the mixture according to the invention comprises less than 1 mol-% and more preferably less than 0.5 mol-% of one or more methyl ester ethoxylates of the formula (I), wherein $R_1$ is selected from the group consisting of linear or branched, preferably linear, polyunsaturated alkenyl groups with 17 carbon atoms and comprising three (3) double bonds, in each case based on the total mixture. Even more preferably, methyl ester ethoxylates of the formula (I), wherein $R_1$ is selected from the group consisting of linear or branched, preferably linear, polyunsaturated alkenyl groups with 17 carbon atoms and comprising three (3) double bonds are essentially absent in the mixture according to the invention.

The levels of polyunsaturation of the residue $R_1$ in the mixture of methyl ester ethoxylates of the formula (I) according to the invention may e.g. be controlled by distillation, fractionation or partial hydrogenation of the raw materials (triglyceride or methyl ester) or of the methyl ester ethoxylate.

Preferably, the mixture according to the invention comprises less than 20 mol-%, more preferably less than 15 mol-% and even more preferably less than 10 mol-% of one or more methyl ester ethoxylates of the formula (I), wherein $R_1$ is selected from the group consisting of linear or branched, preferably linear, saturated alkyl groups with 17 carbon atoms, in each case based on the total mixture.

Preferably, the mixture according to the invention comprises one or more methyl ester ethoxylates of the formula (I), wherein $R_1$ is selected from the group consisting of linear or branched, preferably linear, saturated alkyl groups with 15 carbon atoms, linear or branched, preferably linear, mono- or polyunsaturated alkenyl groups with 15 carbon atoms and combinations thereof, more preferably from 2 to 55 mol-%, even more preferably from 5 to 55 mol-%, particularly preferably from 10 to 55 mol-% and extraordinarily preferably from 15 to 55 mol-% of one or more methyl ester ethoxylates of the formula (I), wherein $R_1$ is selected from the group consisting of linear or branched, preferably linear, saturated alkyl groups with 15 carbon atoms, linear or branched, preferably linear, mono- or polyunsaturated alkenyl groups with 15 carbon atoms and combinations thereof, in each case based on the total mixture.

In case the mixture according to the invention comprises one or more methyl ester ethoxylates of the formula (I), wherein $R_1$ is selected from the group consisting of linear or branched, preferably linear, saturated alkyl groups with 15 carbon atoms, linear or branched, preferably linear, mono- or polyunsaturated alkenyl groups with 15 carbon atoms, and combinations thereof, preferably 90 mol-% or more and more preferably 95 mol-% or more of these methyl ester ethoxylates are methyl ester ethoxylates of the formula (I), wherein $R_1$ is selected from the group consisting of linear or branched, preferably linear, saturated alkyl groups with 15 carbon atoms and combinations thereof.

Even more preferably, methyl ester ethoxylates of the formula (I), wherein $R_1$ is selected from the group consisting of linear or branched, preferably linear, polyunsaturated alkenyl groups with 15 carbon atoms are essentially absent in the mixture according to the invention.

In case the mixture according to the invention comprises one or more methyl ester ethoxylates of the formula (I), wherein $R_1$ is selected from the group consisting of linear or branched, preferably linear, saturated alkyl groups with 14 carbon atoms or less than 14 carbon atoms, linear or branched, preferably linear, mono- or polyunsaturated alkenyl groups with 14 carbon atoms or less than 14 carbon atoms, and combinations thereof, it preferably comprises less than 4 mol-% of such methyl ester ethoxylates of the formula (I), based on the total mixture.

More preferably, methyl ester ethoxylates of the formula (I), wherein $R_1$ is selected from the group consisting of linear or branched, preferably linear, mono- or polyunsaturated alkenyl groups with 14 carbon atoms or less than 14 carbon atoms are essentially absent in the mixture according to the invention.

Preferably, $R_1$ is selected from the group consisting of linear or branched, preferably linear, saturated alkyl groups with 7 to 21 carbon atoms, linear or branched, preferably linear, mono- or polyunsaturated alkenyl groups with 7 to 21 carbon atoms, and combinations thereof, more preferably consisting of linear or branched, preferably linear, saturated alkyl groups with 11 to 19 carbon atoms, linear or branched, preferably linear, mono- or polyunsaturated alkenyl groups with 11 to 19 carbon atoms, and combinations thereof, and even more preferably consisting of linear or branched, preferably linear, saturated alkyl groups with 13 to 19 carbon atoms, linear or branched, preferably linear, mono- or polyunsaturated alkenyl groups with 13 to 19 carbon atoms, and combinations thereof.

The variable x is an integer number for each single methyl ester ethoxylate molecule of the formula (I) in the mixture according to the invention and may be the same or different for the various methyl ester ethoxylate molecules in the mixture according to the invention. Preferably, x is selected from integer numbers from 1 to 150, more preferably from 1 to 100, even more preferably from 1 to 75, particularly preferably from 1 to 50, extraordinarily preferably from 1 to 30 and especially preferably from 1 to 25.

Preferably, at least 10 wt.-% of the total weight of the methyl ester ethoxylates of the formula (I) in the mixture according to the invention are methyl ester ethoxylates with $n_a$ $(CH_2CH_2O)$-units, where $n_a$ is the integer equal to the number n in case the number n itself is an integer or $n_a$ is the integer closest to the number n in case the number n itself is not an integer.

Preferably, at least 30 wt.-% of the total weight of the methyl ester ethoxylates of the formula (I) in the mixture according to the invention are methyl ester ethoxylates with $(n_a-1)$, $n_a$ or $(n_a+1)$ $(CH_2CH_2O)$-units, where $n_a$ is the integer equal to the number n in case the number n itself is an integer or $n_a$ is the integer closest to the number n in case the number n itself is not an integer.

Preferably, at least 50 wt.-% of the total weight of the methyl ester ethoxylates of the formula (I) in the mixture according to the invention are methyl ester ethoxylates with $(n_a-2)$, $(n_a-1)$, $n_a$, $(n_a+1)$ or $(n_a+2)$ $(CH_2CH_2O)$-units, where $n_a$ is the integer equal to the number n in case the number n itself is an integer or $n_a$ is the integer closest to the number n in case the number n itself is not an integer.

For example, when the mixture of methyl ester ethoxylates of the formula (I) according to the invention has a mole average of 10 or 10.3 $(CH_2CH_2O)$-units (n=10 or 10.3), then preferably at least 10 wt.-% of the total weight of the methyl ester ethoxylates of the formula (I) in the mixture according to the invention are methyl ester ethoxylates with 10 $(CH_2CH_2O)$-units, preferably at least 30 wt.-% of the total weight of the methyl ester ethoxylates of the formula (I) in the mixture according to the invention are methyl ester ethoxylates with 9, 10 or 11 $(CH_2CH_2O)$-units, and preferably at least 50 wt.-% of the total weight of the methyl ester ethoxylates of the formula (I) in the mixture according to the invention are methyl ester ethoxylates with 8, 9, 10, 11 or 12 $(CH_2CH_2O)$-units.

In a mixture of methyl ester ethoxylates of the formula (I) according to the invention with a mole average of 10 $(CH_2CH_2O)$-units (n=10), preferably at least 80.0 wt.-%, more preferably at least 85.0 wt.-% and even more preferably at least 90.0 wt.-% of the total weight of the methyl ester ethoxylates of the formula (I) in the mixture according to the invention are methyl ester ethoxylates with 4, 5, 6, 7, 8, 9, 10, 11, 12, 13, 14 or 15 $(CH_2CH_2O)$-units.

The mixture according to the invention may occur together with starting material used for its preparation, in particular methyl ester in case the inventive mixture is prepared by ethoxylation of methyl esters (in the following referred to as "composition A"). In case methyl ester is present in the compositions A, the methyl ester may be present in an amount of 0.01 wt.-% or more, or 0.05 wt.-% or more, or 0.1 wt.-% or more, or 0.2 wt.-% or more, in each case based on the total weight of the composition A. In case methyl ester is present in the compositions A, the methyl ester is present in an amount of preferably less than 5.0 wt.-%, more preferably less than 3.0 wt.-%, even more preferably less than 2.0 wt.-% and particularly preferably less than 1.0 wt.-%, in each case based on the total weight of the composition A.

During the preparation of the mixture according to the invention, by-products may be formed. The formation of by-products in chemical reactions is quite normal since these reactions usually do not take place with a selectivity of 100%. However, in case by-products are formed during the preparation of the mixture according to the invention, these by-products are formed in an amount of preferably less than 20.0 wt.-%, more preferably less than 15.0 wt.-%, even more preferably less than 10.0 wt.-% and particularly preferably less than 5.0 wt.-%, in each case based on the combined total weight of the mixture according to the invention and the by-products, and in particular in case the inventive mixture is prepared by a method according to the invention.

In a preferred embodiment, starting material, and in particular methyl ester, occurring together with the mixture according to the invention is considered to form part of the by-products.

Furthermore, the mixture according to the invention may be purified after its preparation and prior to its use in laundry detergent compositions, e.g. by distilling, stripping or filtering-off by-products, but in a preferred embodiment, the mixture may be used as obtained without prior purification.

The mixture according to the invention may advantageously be used, preferably as a surfactant, in laundry detergent compositions, preferably liquid laundry detergent compositions, e.g. to be applied to an automatic washing machine or as a hand washing detergent.

The mixture according to the invention possesses advantageous foam suppressing properties. This is not only advantageous when the laundry detergent compositions comprising the inventive mixture are applied but also advantageously reduces foaming during handling of the mixture according to the invention, e.g. during the production of the laundry detergent compositions.

Laundry detergent compositions, their preparation and application are well-known in the art. Besides the mixture according to the invention, laundry detergent compositions may comprise one or more optional ingredients, e.g. they may comprise conventional ingredients commonly used in laundry detergent compositions. Examples of optional ingredients include, but are not limited to builders, sequestrants, other surfactants, cosurfactants, bleaching agents, bleach active compounds, bleach activators, bleach catalysts, photobleaches, dye transfer inhibitors, colour protection agents, soil release polymers, anti-redeposition agents, dispersing agents, fabric softening and antistatic agents, fluorescent whitening agents, enzymes, enzyme stabilizing agents, malodour reducers, preservatives, disinfecting agents, hydrotropes, fibre lubricants, anti-shrinkage agents, buffers, fragrances, processing aids, colorants, dyes, pigments, pearlisers and/or opacifiers, anti-corrosion agents, fillers, stabilisers, polymeric thickeners, shading dyes, polyelectrolytes, anti-shrinking agents, anti-wrinkle agents, anti-oxidants, drape imparting agents, anti-static agents, ironing aids, external structurants, microcapsules, additional foam regulators and/or defoamers, and other conventional ingredients for laundry detergent compositions.

The mixture according to the invention may advantageously be prepared by ethoxylation of methyl esters using a special calcium catalyst.

A further subject matter of the invention is a method for preparing a mixture of methyl ester ethoxylates of the formula (I) according to the invention, $$R_1COO-(CH_2CH_2O)_x-CH_3 \quad (I)$$

wherein $R^1$ and x in formula (I), and the average number of ($CH_2CH_2O$)-units of the methyl ester ethoxylates of the formula (I) in the mixture according to the invention are as defined above, from ethylene oxide and one or more methyl esters of the formula (II)

$$R_1COO-CH_3 \quad (II)$$

wherein $R_1$ in formula (II) has the same meaning as in formula (I), and wherein in the method a catalyst (C) is used obtainable by a reaction involving:

(A) calcium hydroxide and (B) a carboxylic acid of the formula (IV), $$R^9—COOH \quad (IV)$$

wherein $R^9$ is selected from saturated or unsaturated, linear or branched, $C_5$-$C_{30}$ alkyl groups, preferably $C_5$-$C_{17}$ alkyl groups and more preferably $C_7$-$C_{13}$ alkyl groups and even more preferably the carboxylic acid (B) is iso-nonanoic acid, and the molar ratio of calcium hydroxide (A) to carboxylic acid (B) in the preparation of the catalyst (C) preferably is from 1:1 to 1:5.

Preferred sources for the groups $R_1COO$ in the mixture of methyl ester ethoxylates of the formula (I) according to the invention are e.g. methyl ester derived from partially hydrogenated or non-hydrogenated palm oil with or without distillation and distilled high oleic methyl ester derived from palm kernel oil, partially hydrogenated methyl ester of low erucic rapeseed oil, methyl ester of high oleic sunflower oil, methyl ester of high oleic safflower oil and methyl ester of high oleic soybean oil.

High Oleic oils are available from DuPont (Plenish high oleic soybean oil), Monsanto (Visitive Gold Soybean oil), Dow (Omega-9 Canola oil, Omega-9 sunflower oil), the National Sunflower Association and Oilseeds International.

The methyl esters of the formula (II) used to prepare the mixture of methyl ester ethoxylates of the formula (I) according to the invention preferably possess a iodine value of less than 110 g($I_2$)/100 g methyl ester of the formula (II), more preferably of less than 100 g($I_2$)/100 g methyl ester of the formula (II), even more preferably of less than 90 g($I_2$)/100 g methyl ester of the formula (II) and particularly preferably of less than 80 g($I_2$)/100 g methyl ester of the formula (II).

The iodine value may be determined according to DIN EN 14111.

In the inventive method for preparing the mixture of methyl ester ethoxylates of the formula (I), the molar ratio of ethylene oxide to the one or more methyl esters of the formula (II) preferably is from 5:1 to 25:1, more preferably from 7:1 to 13:1, even more preferably from 9:1 to 11:1 and particularly preferably 10:1.

The molar ratio of calcium hydroxide (A) to carboxylic acid (B) in the preparation of the catalyst (C) preferably is from 1:1 to 1:5. More preferably, the molar ratio (A):(B) is from 1:1.5 to 1:4, even more preferably from 1:1.8 to 1:2.2 and particularly preferably from 1:1.9 to 1:2.1. In an extraordinarily preferred embodiment, the molar ratio of (A):(B) in the preparation of the catalyst (C) is approximately 1:2.

The reaction for the preparation of the catalyst (C) is preferably carried out in the presence of at least one polar solvent, more preferably a polar solvent comprising at least one hydroxyl group, even more preferably at least one alcohol having 1 to 5 carbon atoms or a mixture thereof with water. In a particularly preferred embodiment the polar solvent is propan-2-ol or a mixture thereof with water. In another particularly preferred embodiment the polar solvent is ethanol or a mixture thereof with water.

It is advisable to perform the reaction for obtaining the catalyst (C) in the presence of an acid (AC) which has a $pK_A$ value of 3 or less, preferably 2 or less, preferably 0 or less, and often −3 or less.

Preferably, the acid (AC) is selected from the group consisting of acids of sulfur oxides and phosphorus oxides, more preferably from the group consisting of sulfuric acid, sulfurous acid, sulfonic acids (among the sulfonic acids methane sulfonic acid is preferred), phosphorus acid, phosphorous acid and phosphonic acids (among the phosphonic acids methane phosphonic acid is preferred). Sulfuric acid, sulfurous acid and methane sulfonic acid are of particular interest.

In a particularly preferred embodiment, the reaction for obtaining the catalyst (C) is performed in the presence of sulfuric acid.

Preferably, the acid (AC) is used in the reaction for obtaining the catalyst (C) thus that the molar ratio of the calcium hydroxide (A) to the acid (AC) is from 1.0:0.1 to 1.0:1.0, more preferably from 1.0:0.2 to 1.0:0.7 and even more preferably from 1.0:0.3 to 1.0:0.5.

It is particularly advantageous to prepare the calcium catalyst (C) by first allowing the calcium hydroxide (A) to react with the carboxylic acid (B), preferably in a solvent as described above, after which the reaction mixture is further treated with the acid (AC).

For the reaction by which the calcium catalyst (C) is obtained, any common reactor may be employed, preferably a reactor with an agitating/mixing means, such as, e.g., a magnetic stirrer, a mechanical stirrer, a static mixer, a blender, a batch disperser, or a Rotor-Stator disperser.

The preparation of the catalyst (C) is preferably carried out under a pressure of from 0.5 to 2 bar, more preferably from 0.8 to 1.5 bar, even more preferably from 0.9 to 1.2 bar.

In a preferred embodiment, the catalyst is prepared under atmospheric pressure. Furthermore, the catalyst (C) is preferably prepared at a temperature of from −30° C. to 80° C., preferably from −10° C. to 60° C., more preferably from 0° C. to 50° C. In a preferred embodiment, the catalyst is prepared at a temperature of from 20 to 40° C., especially at room temperature.

The thus prepared calcium catalyst (C) typically has a content of $Ca^{2+}$ ions that is from 0.5 to 5 wt.-%, often from 1 to 4 wt.-%, often from 2.5 to 3.5 wt.-%.

Optionally, the catalyst may be purged of volatile components, such as the solvent, water and other volatile byproducts by employing commonly used methods. Preferably, the volatile components are removed in vacuo, e.g. under a pressure below 0.8 bar, preferably below 0.3 bar, more preferably below 0.1 bar, and/or at elevated temperatures, e.g. 50 to 180° C., preferably 70 to 150° C., more preferably 80 to 120° C.

In a particularly preferred embodiment, the volatile compounds are removed on a rotary evaporator at a pressure below 0.1 bar and a temperature of from 80° C. to 120° C.

Preferably, the method of the invention for preparing a mixture of methyl ester ethoxylates of the formula (I) according to the invention comprises the steps of i) introducing the catalyst (C) as defined above and one or more methyl esters of the formula (II) as described above into a pressure-resistant reactor;
ii) optionally replacing the air in the reactor with nitrogen or other protective gas;
iii) optionally drying the reactor content at a temperature of from 50 to 200° C. and/or a pressure below 0.8 bar;
iv) heating the content of the reactor to a temperature of from 80° C. to 200° C.;
v) optionally pressurizing the reactor with nitrogen or other protective gas to a pressure of from 0.3 bar to 3.5 bar above atmospheric pressure;
vi) pressurizing the reactor with ethylene oxide gas to a pressure of from 1.5 bar to 10 bar above atmospheric pressure with the proviso that the pressure is above the pressure prior to step vi);
vii) allowing the mixture to react until the pressure in the reactor is constant.

In step i) the catalyst (C) may be introduced as obtained from the reaction of its preparation described above directly, or in its form that has been purged of volatile compounds, but preferably as obtained from the reaction of its preparation described above directly. The methyl esters of formula (II) may be introduced in their raw form or may be purified prior to use.

The calcium catalyst (C) is preferably introduced into the reactor in an amount of from 0.1 to 5 wt.-%, preferably from 0.2 to 3 wt.-%, more preferably from 0.3 to 2 wt.-% based on the total weight of the mixture of methyl esters of formula (II) and ethylene oxide.

The pressure-resistant reactor is not particularly limited but is designed to withstand the pressures employed in the process, thus that it is not damaged during the process. Preferably, the reactor is designed to withstand pressures both above 10 bar, more preferably above 15 bar, and below 0.01 bar, more preferably below 0.001 bar. Preferably, the pressure-resistant reactor is an autoclave, more preferably an autoclave equipped with an agitating means such as a magnetic or a mechanical stirrer.

Generally, the replacement of air in the reactor with nitrogen or other protective gas is not necessarily required, because the mixture of methyl ester ethoxylates of the formula (I) according to the invention would at least partially be generated in the process. However, air, particularly oxygen, in the reactor may lead to safety concerns during alkoxylation reactions in general and decomposition products due to oxidation and/or hydrolysis of the employed materials and of the generated products, especially at elevated temperatures. Therefore, it is advisable to carry out step ii) of the method of the invention after step i).

In general, the step of drying the reactor content is also not necessarily required, because the mixture of methyl ester ethoxylates of the formula (I) according to the invention would at least partially be generated in the process. However, water and alcohols may facilitate hydrolysis and transesterification of the employed materials and of the generated products under the reaction conditions. Especially if in step i) the calcium catalyst (C) is introduced into the reactor as obtained from the reaction of its preparation described above directly, it is advisable to carry out the drying step, since the directly obtained catalyst (C) typically contains residues of polar solvents or their mixtures with water. In case the calcium catalyst (C) is purged of volatile components before introducing it into the reactor, the drying step iii) may be omitted. Nevertheless, in this case it may be advisable to carry out step iii) since volatile components may also be present as impurities in the one or more methyl esters of formula (II). Therefore, in particularly preferred embodiments, step iii) is carried out.

The step iii) of drying the reactor content is typically performed at a temperature of from 50° C. to 200° C., preferably of from 50° C. to 180° C., more preferably of from 60° C. to 150° C., even more preferably of from 70° C. to 130° C., particularly preferably of from 80° C. to 120° C., and at a pressure below 0.8 bar, preferably below 0.1 bar, more preferably below 0.05 bar. The thus generated vacuum is preferably a dynamic vacuum.

The vacuum pump for generating the vacuum is not particularly limited; it is, however, preferable to use an aspirator for generating the vacuum. Furthermore, it is advisable to reduce the pressure and increase temperature in the reactor gradually to prevent boiling retardation. In a particularly preferred embodiment, the step of drying the reactor content is carried out at a temperature of from 80° C. to 120° C. and a pressure below 0.01 bar, preferably over a period of at least 15 minutes, more preferably over a period of at least 30 minutes, even more preferably over a period of at least 1 hour. It is particularly preferred to dry the content of the reactor to constant mass.

After the drying step iii) the fluid line between the vacuum pump and the reactor is interrupted, to ensure that the components added to the reactor after the drying remain in the reactor and are not directly withdrawn therefrom. Furthermore, it is preferable to compensate the vacuum in the reactor with nitrogen or other protective gas before carrying out the further steps, to reduce the risk of air entering the reactor.

Step iv) of heating the content of the reactor is generally performed at a temperature of from 80° C. to 200° C., preferably from 120° C. to 190° C., more preferably from 160° C. to 180° C. This temperature is maintained at least until step vi) is finished, preferably until step vii) is finished.

After setting the temperature in step iv), the reactor may be optionally pressurized in step v) with nitrogen or other protective gas to a pressure of from 0.3 to 3.5 bar, preferably of from 0.3 to 3.5 bar, more preferably of from 0.5 to 3.0 bar, even more preferably of from 0.7 to 2.5 bar and particularly preferably of from 0.8 to 2.2 bar above atmospheric pressure. By carrying out this step v), ethylene oxide introduced in the following step is diluted with the protective gas, thus that pressure-controlled dosage of ethylene oxide into the reactor is facilitated.

In step vi) the reactor is further pressurized with ethylene oxide to a total internal pressure of from 1.5 to 10 bar, preferably from 2 to 8 bar, more preferably from 3 to 6 bar, even more preferably from 4 to 5 bar, above atmospheric pressure, with the proviso that the pressure in step vi) is above the pressure before step vi).

During step vii), after introduction of the intended amount of ethylene oxide, the ethylene oxide inlet is closed and the reaction is allowed to proceed until the pressure in the reactor is constant.

In the sense of the invention, the pressure is considered constant, if it does not change by more than 0.05 bar over a period of 15 minutes, preferably 30 minutes, more preferably 1 hour. It is particularly preferred that the pressure in the reactor does not change by more than 0.01 bar over a period of 1 hour.

Usually, the entire amount of ethylene oxide is added to the reactor and a constant pressure is obtained by the method of the invention within less than 1000 minutes, often within less than 800 minutes. In particularly preferred embodiments, constant pressure is obtained within less than 700 minutes. At this point, the reaction between ethylene oxide and the one or more methyl esters of formula (II) is considered to be finished.

After completion of step vii), it is advisable to remove residual ethylene oxide from the reactor before isolating the mixture of methyl ester ethoxylates of the formula (I) according to the invention, in order to prevent any unwanted reactions with ethylene oxide from taking place after isolation of the product. Preferably, residual ethylene oxide is removed from the reactor by cooling the reactor content to a temperature of from 50 to 120° C., more preferably from 70 to 100° C. and even more preferably from 85 to 95° C., and employing a pressure of below 0.8 bar, preferably below 0.1 bar, more preferably below 0.05 bar. The thus generated vacuum is preferably a dynamic vacuum. The vacuum pump for generating the vacuum is not particularly limited; it is, however, preferable to use an aspirator for generating the vacuum. Removal of residual ethylene oxide under these conditions is preferably carried out for at least 10 minutes, preferably at least 30 minutes, more preferably at least 1 hour.

The method of isolation of the mixture of methyl ester ethoxylates of the formula (I) according to the invention is not particularly limited. However, it is preferable to isolate the product at elevated temperatures, specifically at temperatures of from 30 to 120° C., preferably from 40 to 100° C., more preferably from 50 to 90° C. At these temperatures the mixture of methyl ester ethoxylates of the formula (I) according to the invention is typically in a liquid state and has a sufficiently low viscosity, and therefore may be transferred out of the reactor more easily than in the solid state, e.g. by pouring the product out of the reactor or via a bottom valve, thereby minimizing the amount of residues in the reactor. Thus, the subsequent cleaning and maintenance of the reactor is also facilitated.

The method for preparing a mixture of methyl ester ethoxylates of the formula (I) according to the invention using the calcium catalyst (C) described above may be interrupted at any stage, and continued at a later point in time, without the reaction time being significantly increased.

It was found that the method for preparing a mixture of methyl ester ethoxylates of the formula (I) according to the invention leads to homogeneous products.

Preferably, the saponification value of the product of preparing the mixture of methyl ester ethoxylates of the formula (I) according to the invention, determined according to DIN EN ISO 3681, is below 220 mg KOH/g, more preferably below 150 mg KOH/g and even more preferably below 100 mg KOH/g.

Preferably, the hydroxyl value of the product of preparing the mixture of methyl ester ethoxylates of the formula (I) according to the invention, measured according to DIN EN ISO 4629-2, is below 15 mg KOH/g and more preferably below 10 mg KOH/g.

A further subject matter of the invention is an ethoxylation product, preferably a mixture according to the invention, obtainable by the inventive method described for preparing a mixture according to the invention. The ethoxylation product may comprise further substances such as starting materials or reactants, in particular methyl esters, and/or by-products.

The examples below are intended to illustrate the invention in detail without, however, limiting it thereto.

EXAMPLES

Synthesis Example 1 (C-1)

Preparation of Calcium Catalyst (C) with Carboxylic Acid of Formula (IV)

A mixture of 622.0 g iso-nonanoic acid, 1922.4 g of propan-2-ol and 147.6 g water was dispersed for 1 minute with a Rotor-Stator disperser. 148.2 g of calcium hydroxide were added within 30 minutes. After this, 60.05 g of concentrated sulfuric acid were added within 5 minutes and the mixture was again dispersed for 120 minutes, providing a catalyst with a $Ca^{2+}$ content of 2.75 wt.-% (henceforth "(C-1)").

Synthesis Examples 2-4 ((C-2), (C-3) and (C-4))

Further catalysts were prepared according to synthesis example 1 but with the sole difference that 72.06 g of concentrated sulfuric acid were used (henceforth "(C-2)") or that 84.07 g of concentrated sulfuric acid were used (henceforth "(C-3)") or that 96.09 g of concentrated sulfuric acid were used (henceforth "(C-4)").

Synthesis Example 5

The following fractionated Palm based methyl esters (Fatty acid methyl esters A and B) and Rapeseed methyl ester have been used for the alkoxylation procedure.

| | Fatty acid methyl ester A [wt.-%/mol-%] (Inventive) | Fatty acid methyl ester B [wt.-%/mol-%] (Inventive) | Rapeseed methyl ester [wt.-%/mol-%] (comparative) |
|---|---|---|---|
| <C16 | 2.9/3.4 | — | 0.1/0.1 |
| C16:0 | 25.8/27.5 | 5.4/5.9 | 5.1/5.6 |
| C18:0 | 7.9/7.6 | 2.6/2.6 | 1.6/1.6 |
| C18:1 | 53.9/52.3 | 79.7/79.2 | 62.4/62.0 |
| C18:2 | 8.8/8.6 | 12.3/12.3 | 20.3/20.3 |
| C18:3 | — | — | 8.7/8.8 |
| >C18 | 0.6/0.5 | — | 1.8/1.6 |
| (C18:1):(C18 other) | 3.2:1.0 | 5.3:1.0 | 2.0:1.0 |

General Alkoxylation Procedure

The fatty acid methyl ester and the catalyst were placed into a glass autoclave, which was then flushed with nitrogen by alternatingly applying vacuum and introducing nitrogen (3 cycles). The mixture was dried under aspirator vacuum at 100° C. for 1 hour. The pressure in the autoclave was restored to ambient pressure with nitrogen and heated to 175° C. At this temperature the autoclave was pressurized with nitrogen to a pressure of 2.0 bar above atmospheric pressure, after which pressure-controlled dosage of ethylene oxide took place up to a maximum pressure of 4.5 bar above atmospheric pressure.

The ethoxylation was carried out in a semi-batch process with automated dosage of ethylene oxide within a given temperature window and up to the specified maximum pressure. The pressure was adjusted according to the increased filling volume of the vessel. After introduction of the intended amount of ethylene oxide and closing the ethylene oxide inlet, the reaction was continued until the pressure became constant.

The reactor content was cooled to 90° C. and aspirator vacuum was applied for 30 minutes in order to remove residual ethylene oxide. The temperature was reduced to 80° C. and the final product was transferred into storage vessels and analyzed. The typical batch scale was 400 g to 2000 g. The uptake of the intended amount of ethylene oxide was assured by gravimetry and by determination of the saponification value according to DIN EN ISO 3681.

The materials employed and reaction times to constant pressure in the synthesis example 5 are shown in the following Table 1 (molar equivalents):

Application Example 1

Methyl ester ethoxylates MEE Nos. 1 (also referred to as "MEE A"), 5 (also referred to as "MEE B") and 6 (also referred to as "Rapeseed MEE") of Table 1 were used for application example 1.

A laundry detergent containing 10 wt.-% of surfactant (remainder water) was added to 26° FH (degrees French Hardness) water at 293K to give 0.2 g/L surfactant in water.

10 ml of the solution was placed in a tube of 2.2 cm diameter and stoppered. The tube was inverted 40 times to produce foam and a photograph taken of the tube. Soil was then added in 1 mg aliquots and the inversion process and photography cycle repeated until 4 mg total soil was added. The soil was an emulsion with a weight ratio of 5:5:1 olive oil:water:kaolin+0.13 wt.-% flour. Kaolin was purchased from Sigma-Aldrich.

The height of the foam was measured as the difference between the meniscus and top of the foam. Each foam measurement was the average of 4 repeat tubes. A plot of soil level versus foam height was made for 1 to 4 mg soil and a straight line fitted to the points using regression analysis (LINEST function of Microsoft excel).

The gradient is the change of foam level per unit soil (Δfoam) in cm foam/per mg soil, and the intercept is a measure of the maximum foam ($Foam^{Max}$) in cm. The values are given in the table below, alongside the standard error (±values). The expected values were calculated from the values at 100% with a linear relationship based on the inclusion levels.

TABLE 1

| MEE No. | Fatty acid methyl ester [1 equivalent] | Ethylene oxide amount [equivalents] | Catalyst | Catalyst amount [wt.-%] | Induction time [minutes] | Reaction time [minutes] | Saponification value [mg KOH/g] | Hydroxyl value [mg KOH/g] | Residual fatty acid methyl ester [wt.-%] |
|---|---|---|---|---|---|---|---|---|---|
| 1 | A | 10 | C-1 | 0.5 | 180-240 | 600 | 81.0 | 6.8 | 0.4 |
| 2 | A | 10 | C-2 | 0.5 | 100-120 | 450 | 82.2 | 6.1 | 0.3 |
| 3 | A | 10 | C-3 | 0.5 | 180-240 | 900 | 82.5 | 4.9 | 0.4 |
| 4 | A | 10 | C-4 | 0.5 | 180-240 | 670 | 83.4 | 4.8 | 0.4 |
| 5 | B | 10 | C-1 | 0.5 | n.d. | n.d. | 80.1 | 3.9 | 0.7 |
| 6 | Rapeseed methyl ester | 10 | C-1 | 0.5 | n.d. | n.d. | 77.0 | 4.7 | 0.4 |

MEE: methyl ester ethoxylate;
n.d.: not determined

Synthesis Example 6

In analogy to the examples represented in Table 1 above methyl ester ethoxylates with an average of 10 moles of ethoxylation (n=10) may be synthesised from the methyl ester of high oleic, safflower, sunflower and soybean oil with fatty acid compositions (wt.-%) as reported in the table below.

| | Safflower (inventive) | Sunflower (inventive) | Soybean (inventive) |
|---|---|---|---|
| C16:0 | 4 | 3 | 6 |
| C18:0 | 1 | 3 | 3 |
| C18:1 | 77 | 76 | 75 |
| C18:2 | 13 | 12 | 8 |
| C18:3 | 0 | 0 | 1 |
| (C18:1):(C18 other) | 5.5:1.0 | 5.1:1.0 | 6.3:1.0 |

The experiment was performed with a 1:1 mixture of methyl ester ethoxylate with sodium lauryl ether sulfate with 3 moles of ethoxylation. The anionic surfactant provides copious foam.

| | Maximum foam (($Foam^{Max}$ in cm) |
|---|---|
| MEE A (inventive) | 11.79 (±1.15) |
| MEE B (inventive) | 11.11 (±0.28) |
| Rapeseed MEE (comparative) | 16.96 (±1.05) |

The inventive mixtures of methyl ester ethoxylates provide better antifoaming than the comparative control.

The invention claimed is:

1. A mixture of methyl ester ethoxylates of the formula (I)

$$R_1COO-(CH_2CH_2O)x-CH3$$

wherein:

1) $R_1$ is selected from the group consisting of linear or branched saturated alkyl groups with 7 to 30 carbon atoms, linear or branched mono- or polyunsaturated alkenyl groups with 7 to 30 carbon atoms, and combinations thereof, and x is selected from integer numbers from 1 to 200;

2) the mixture has an average number of ($CH_2CH_2O$) units ("n") of the methyl ester ethoxylates of formula (I) of from 5 to 25; and 3) the mixture comprises at least components (Z1) and (Z2), wherein (Z1) is present in an amount of at least 25 mol-% of the methyl ester ethoxylate mixture according to formula (I) and $R_1$ is selected from the group consisting of linear or branched monounsaturated alkenyl groups with 17 carbon atoms, and combinations thereof;

(Z2) is of the formula (I), wherein $R_1$ is selected from the group consisting of linear or branched saturated alkyl groups with 17 carbon atoms, linear or branched polyunsaturated alkenyl groups with 17 carbon atoms, and combinations thereof; and the molar ratio of component (Z1) to component (Z2) is from 2.9:1.0 to 7.0:1.0.

2. The mixture according to claim 1, wherein the methyl ester ethoxylates of the formula (I), wherein $R_1$ is selected from the group consisting of linear or branched monounsaturated alkenyl groups with 17 carbon atoms and combinations thereof, are methyl ester ethoxylates of oleic acid.

3. The mixture according to claim 1, wherein the mixture comprises less than 15 mol-% of one or more methyl ester ethoxylates of the formula (I), wherein $R_1$ is selected from the group consisting of linear or branched, polyunsaturated alkenyl groups with 17 carbon atoms, in each case based on the total mixture.

4. The mixture according to claim 1, wherein the mixture comprises less than 20 mol-% of one or more methyl ester ethoxylates of the formula (I), wherein $R_1$ is selected from the group consisting of linear or branched, saturated alkyl groups with 17 carbon atoms, in each case based on the total mixture.

5. The mixture according to claim 1, wherein the mixture comprises one or more methyl ester ethoxylates of the formula (I), wherein $R_1$ is selected from the group consisting of linear or branched, saturated alkyl groups with 15 carbon atoms, linear or branched, mono- or polyunsaturated alkenyl groups with 15 carbon atoms, and combinations thereof, in each case based on the total mixture.

6. The mixture according to claim 5, wherein 90 mol-% or more of the one or more methyl ester ethoxylates of the formula (I), wherein $R_1$ is selected from the group consisting of linear or branched, saturated alkyl groups with 15 carbon atoms, linear or branched, mono- or polyunsaturated alkenyl groups with 15 carbon atoms, and combinations thereof, are methyl ester ethoxylates of the formula (I), wherein $R_1$ is selected from the group consisting of linear or branched, saturated alkyl groups with 15 carbon atoms and combinations thereof.

7. The mixture according to claim 1, wherein $R_1$ is selected from the group consisting of linear or branched, saturated alkyl groups with 7 to 21 carbon atoms, linear or branched, mono- or polyunsaturated alkenyl groups with 7 to 21 carbon atoms, and combinations thereof.

8. The mixture according to claim 1, wherein at least 10 wt.-% of the total weight of the methyl ester ethoxylates of the formula (I) are methyl ester ethoxylates with $n_a$ ($CH_2CH_2O$)-units, where $n_a$ is the integer equal to the number n in case the number n itself is an integer or $n_a$ is the integer closest to the number n in case the number n itself is not an integer.

9. A method for preparing a mixture of methyl ester ethoxylates of the formula (I) according to claim 1, the method comprising contacting ethylene oxide with one or more methyl esters of the formula (II)

$$R_1COO-CH_3 \quad (II)$$

in the presence of a catalyst (C), wherein $R_1$ in formula (II) has the same meaning as in formula (I), and the catalyst (C) is obtainable by a reaction involving (A) calcium hydroxide and (B) a carboxylic acid of the formula (IV), $$R^9-COOH \quad (IV)$$

wherein $R_9$ is selected from saturated or unsaturated, linear or branched, $C_5$-$C_{30}$ alkyl groups, and the molar ratio of calcium hydroxide (A) to carboxylic acid (B) in the preparation of the catalyst (C) is from 1:1 to 1:5.

10. The method according to claim 9, wherein the reaction for obtaining the catalyst (C) is performed in the presence of an acid (AC) which has a $pK_A$ value of 3 or less, and the acid (AC) is selected from the group consisting of acids of sulfur oxides and phosphorus oxides.

11. The method according to claim 10, wherein the reaction for obtaining the catalyst (C) is performed in the presence of sulfuric acid.

12. The method according to claim 10, wherein the molar ratio of the calcium hydroxide (A) to the acid (AC) is from 1.0:0.1 to 1.0:1.0.

13. An ethoxylation product, obtainable by the method as described in claim 10.

14. The mixture according to claim 1, wherein the mixture comprises from 30 to 85 mol-% of the one or more methyl ester ethoxylates of the formula (I), wherein $R_1$ is selected from the group consisting of linear or branched monounsaturated alkenyl groups with 17 carbon atoms and combinations thereof, in each case based on the total mixture.

15. The mixture according to claim 1, wherein the mixture comprises less than 10 mol-% of one or more methyl ester ethoxylates of the formula (I), wherein $R_1$ is selected from the group consisting of linear or branched, polyunsaturated alkenyl groups with 17 carbon atoms, in each case based on the total mixture.

16. The mixture of claim 1, wherein the mixture comprises less than 10 mol-% of one or more methyl ester ethoxylates of the formula (I), wherein $R_1$ is selected from the group consisting of linear saturated alkyl groups with 17 carbon atoms, branched saturated alkyl groups with 17 carbon atoms, and combinations thereof.

17. The mixture of claim 1, wherein at least 90.0 wt.-% of the total weight of the methyl ester ethoxylates of the formula (I) in the mixture are methyl ester ethoxylates with 4 to 15 ($CH_2CH_2O$)-units.

* * * * *